United States Patent [19]
Eastman

[11] Patent Number: 5,405,431
[45] Date of Patent: Apr. 11, 1995

[54] AUTOMATIC ADSORPTION TOWER SWITCHING SYSTEM

[75] Inventor: Alan D. Eastman, Bartlesville, Okla.

[73] Assignee: Phillips Petroleum Company, Bartlesville, Okla.

[21] Appl. No.: 131,233

[22] Filed: Oct. 4, 1993

[51] Int. Cl.⁶ .......................................... B01D 53/04
[52] U.S. Cl. ........................................ 95/11; 95/132; 95/143; 96/111; 96/133; 210/662; 210/690
[58] Field of Search ............... 95/8, 11, 131, 132, 95/143–147; 96/111, 121, 133; 210/662, 690

[56] References Cited

U.S. PATENT DOCUMENTS

| | | |
|---|---|---|
| 3,540,188 | 11/1970 | Barrere, Jr. et al. .......... 96/111 X |
| 4,021,211 | 5/1977 | Turek et al. ................... 95/11 |
| 4,056,369 | 11/1977 | Quackenbush .................. 95/11 |
| 4,344,142 | 8/1982 | Diehr et al. .................. 364/473 |
| 4,414,003 | 11/1983 | Blaudszun ................... 96/111 X |
| 4,504,286 | 3/1985 | Carlisle et al. ................ 55/20 |
| 4,557,921 | 12/1985 | Kirsch et al. ............... 95/131 X |
| 4,594,231 | 6/1986 | Nishino et al. .............. 95/131 X |
| 4,640,831 | 2/1987 | DeVries ....................... 423/481 |
| 5,104,545 | 4/1992 | Means et al. ................ 210/662 X |
| 5,135,656 | 8/1992 | Means et al. ................ 210/662 X |

FOREIGN PATENT DOCUMENTS

2-245216 10/1990 Japan ........................... 96/111
749409 7/1980 U.S.S.R. ......................... 95/8

OTHER PUBLICATIONS

Simon Miron and Robert J. Lee, "Molecular Structure of Conjunct Polymers", Journal of Chemical and Engineering Data, vol. 8, No. 1, Jan. 1963, pp. 150–160.

Perry's Chemical Engineers' Handbook, 5th Edition, selected sections of Chapter 22, McGraw-Hill, 1984.

*Primary Examiner*—Robert Spitzer
*Attorney, Agent, or Firm*—George E. Bogatie

[57] ABSTRACT

In a continuous adsorption process using dual towers for separation of a multi-component feed with one tower active and the other on regeneration, automatic switching of the tower feed based on loading of a hydrogen fluoride (HF) component in the active tower is achieved by inferring HF loading based on concentration measurement of acid soluble oil (ASO). An optimum switching point, which switches tower feed near full HF capacity of the active tower but before HF breakthrough occurs, is based on calculating a second derivative for a concentration vs. time curve of ASO in the active bed effluent.

13 Claims, 4 Drawing Sheets

AUTOMATIC ADSORPTION TOWER SWITCHING SYSTEM

This invention relates to process control. More specifically it relates to switching a feedstream between parallel arranged adsorption beds used in a separation process which removes a hydrogen halide compound from sulfolane.

Fixed adsorption bed contactors are used in many chemical separation applications for the selective collection and concentration, onto solid surfaces, of particular types of molecules contained in a liquid or a gas. When the adsorptive capacity of the bed is reached, it must be regenerated to enable its reuse. Therefore to achieve essentially continuous operation from an adsorption process, a particular bed used in the separation process must cycle from adsorption to desorption.

A parallel arrangement of adsorption beds is often utilized in a separation process to achieve continuous operation such that one adsorption bed is actively separating chemical components while the second bed is being regenerated. Regeneration of beds used in a multi-component separation system to adsorb hydrogen halide contaminates from a liquid process stream which is made-up of sulfolane and which also contains acid soluble oil (ASO), is accomplished by first passing a solvent for the ASO through the exhausted bed followed by passing a stripping fluid through the bed under conditions so as to regenerate the exhausted bed. Alkylation catalyst regeneration has been disclosed and claimed in patent application Ser. No. 08/077,142 of Eastman, et al, filed Jun. 16, 1993, now U.S. Pat. No. 5,306,859.

Ideally, an adsorption bed would be utilized to its full capacity before the flow of liquid to be separated is switched to a fresh bed. However, in many operations a large margin of error must be maintained so as to insure that a hazardous hydrogen halide component such as hydrogen fluoride (HF) will not break through the adsorption bed. This large margin of error required in switching beds on a predetermined time cycle results in inefficient operation.

Ideally, switching of the adsorption beds would be controlled on the basis of their loading so as to achieve their true capacity rather than operate on a predetermined time cycle. Since measurements based on HF are extremely difficult, attempts have been made to incorporate an inferential analyzer into a control scheme which would switch between adsorption beds based on HF loading of the exhausted bed. For hydrogen halide compounds these attempts include measuring the pH of the bed effluent and also calculation of the amount of material passed through the bed based on measurement of hydrogen halide concentration and flow rate. The aforementioned attempts, however, have not generally proven reliable enough for field applications.

It is thus an object of this invention to provide a method and an apparatus for automatically switching the flow of a liquid feed stream comprising sulfolane, a hydrogen halide compound and ASO between parallel arranged adsorption beds.

It is a further object of the invention to utilize the concept of control based on HF loading of adsorbent material for automatically switching feedstream flow between two adsorption beds.

It is a still further object of this invention to eliminate reliability problems which occur when an adsorption bed switching is based on process measurements involving HF.

SUMMARY OF THE INVENTION

In accordance with this invention I have discovered that a suitable adsorbent material for a hydrogen halide compound also adsorbs ASO to some proportional extent, whereby the amount of the hydrogen halide compound captured in the bed during an adsorption cycle is inferred from the easily measured parameter of ASO concentration of the bed effluent. Switching of the flow of a process stream from a first tower containing an exhausted bed to a second tower containing a fresh bed is accomplished responsive to a signal representative of ASO concentration measurements, and which infers that an exhaustive amount of the hydrogen halide compound has been captured in the active bed.

In a preferred embodiment the concentration of ASO in the effluent of an active bed is measured on line with the aid of UV-VIS (ultraviolet-visible) spectroscopy and this measurement yields an S shaped curve of ASO concentration as a function of time. Bed switching is triggered by a digital type signal based on the second derivative of the S shaped curve for ASO concentration reaching a maximum value, whereby the bed is switched when it is near its full capacity but before breakthrough of the hydrogen halide compound occurs.

Other objects and advantages of the invention will be apparent from the foregoing brief description of the invention and the claims as well as a detailed description of the drawings which are briefly described as follows.

DETAILED DESCRIPTION OF THE INVENTION

The invention is described in terms of a multi-component separation wherein contaminants of HF and ASO are removed from a liquid sulfolane stream. However, the invention is generally applicable to the separation of multi-component systems wherein an adsorbent material proportionally collects more than one type of molecule on its surface.

Acid soluble oil is produced as a reaction by-product in an alkylation process which comprises the step of contacting an olefins/isoparaffin hydrocarbon mixture with an alkylation catalyst, which comprises a hydrogen halide component and sulfolane. As used within this description and in the claims, the term "acid soluble oil" or "ASO", means those conjunct polymers which are highly olefinic oils produced in an acid catalyzed reaction of hydrocarbons and which are soluble in the liquid catalyst. An extensive description and characterization of certain types of conjunct polymers oils is provided in the *Journal of Chemical and Engineering Data* Article entitled "Molecular Structure of Conjunct Polymers", pages 150–160, Vol. 8, No. 1, January 1963 by Miron and Lee.

The hydrogen halide component of the catalyst composition or catalyst mixture can be selected from the group of compounds consisting of hydrogen fluoride (HF), hydrogen chloride (HCl), hydrogen bromide (HBr), and mixtures of two or more thereof. The preferred hydrogen halide component, however, is hydrogen fluoride, which can be utilized in the catalyst composition in anhydrous form; but, generally, the hydrogen fluoride component utilized can have a small amount of water.

Figure 1:
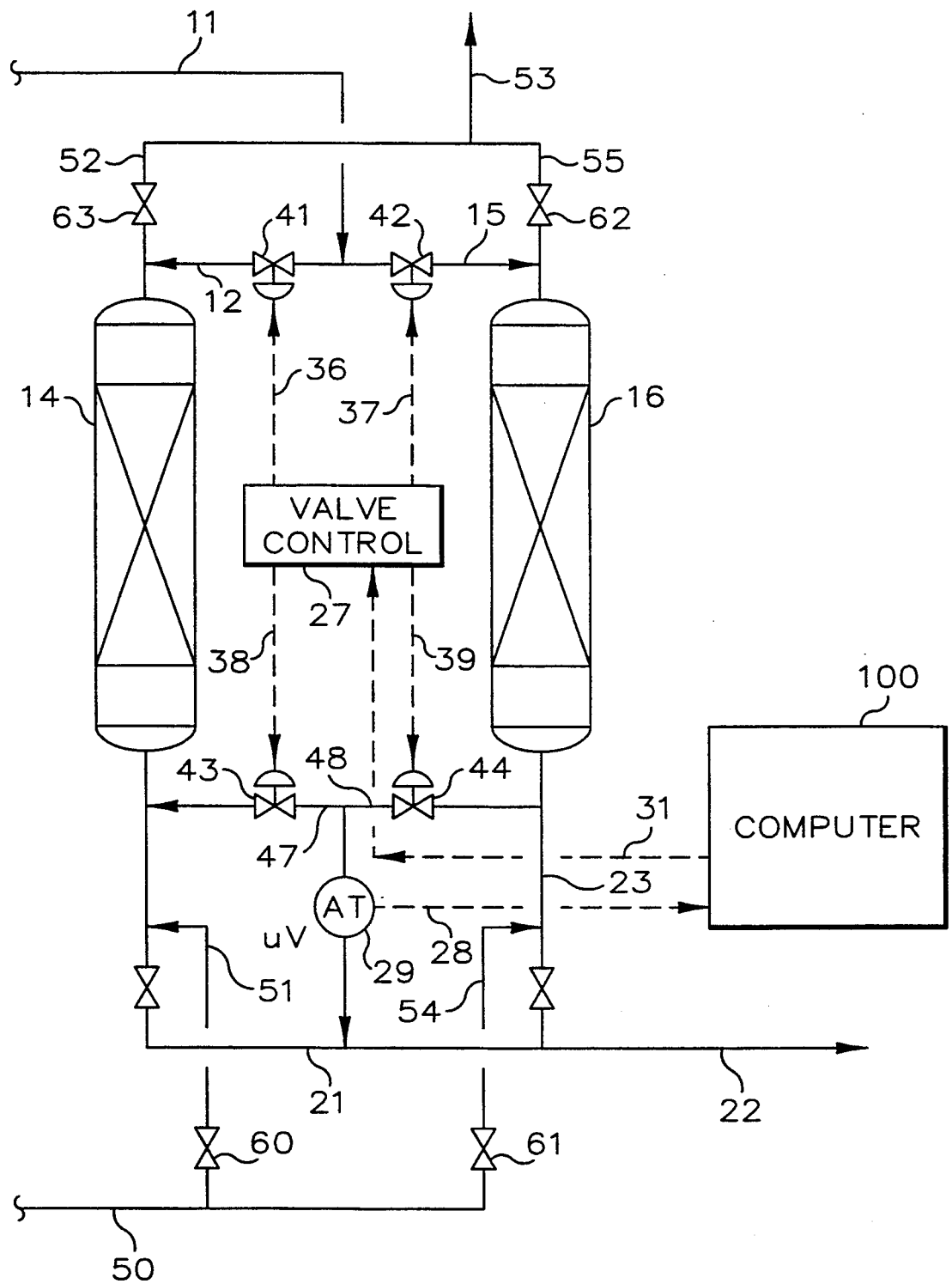
FIG. 1 is an illustration of parallel arranged adsorbent beds and the associated control system of the present invention for switching operation between the two beds.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any analyzer transducer are electrical in form.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signal based on measured process parameters. Any digital computer having software that allows operation in a real time environment for reading values of external variables and transmitting signals to external devices is suitable for use in this invention. Preferably a computer controlled spectrometer having sufficient excess computing capacity to calculate the required control signal is utilized.

Signal lines are also utilized herein to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to FIG. 1, the feedstream to be separated is provided through the combination of conduits 11 and 12 to the adsorption tower 14 and through the combination of conduits 11 and 15 to the adsorption tower 16. The adsorption towers 14 and 16 will generally contain an adsorption bed preferably made up of materials such as gamma-alumina or reversible bases.

Treated liquid sulfolane still containing a substantially amount of ASO is removed from the adsorption tower 14 through the combination of conduits 21 and 22. In like manner the treated sulfolane is removed from the adsorption tower 16 through the combination of conduits 23 and 22.

An analysis signal 28, which will be described more fully hereinafter, is provided from a UV-analyzer 29 to computer 100 and is utilized to monitor the concentration of ASO of the effluent streams from the adsorption towers 14 or 16 depending on the position of valves 43 and 44. Valve control box 27 provides control signals 36–39 to valves 41–44 respectively, which are operably located in conduits 12, 15, 47 and 48 respectively. When an adsorption cycle for adsorption tower 14 is completed as indicated by a change in signal 31, the valve control will operate to close valves 41 and 43 and open valves 42 and 44. In like manner when a change in signal 31 indicates that the adsorption cycle is completed for adsorption tower 16 the valve control 27 will operate to close valves 42 and 44 and open valves 41 and 43. The manner in which the switching is accomplished will be described more fully hereinafter.

It is noted that the adsorption tower which is not being utilized for separating compounds will be placed on a regeneration cycle using conduits 21, 23 and 50–55 and valves 60–63 to supply regenerating agents. However, since the regeneration plays no part in the present invention, for the sake of simplicity, regeneration will not be described in detail. Also other conventional equipment which would normally be associated with an adsorption process has not been illustrated for the same reason.

As previously stated signal 28 is provided from UV-analyzer 29 to computer 100. Any suitable spectrum analyzer having capacity for transmitting and detecting radiation in the UV and VIS wavelength (i.e. 375 nm to 670 nm) can be utilized. Preferably the selected spectrometer will embody a microprocessor as an integral component of the analytical instrument and wherein the microprocessor has capacity for real time computing tasks other than the required task for upgrading the instrument operation.

A sample of the effluent stream flowing from adsorption towers 14 or 16 is provided to the UV spectrometer 29 through conduits 47 and 48 respectively. The magnitude of signal 28, which typifies ASO concentration, will follow the generally S shaped curve illustrated in FIG. 2, wherein the maximum rate of concentration change as determined mathematically by a second derivative, occurs at the inflection point marked "A" in FIG. 2. Breakthrough of HF from the adsorption tower occurs sometime later at the point marked. "B" in FIG. 2. Switching adsorption towers essentially at the point "A" in FIG. 2 can be achieved by determining when the second derivative of the concentration curve equals zero.

Figure 2:
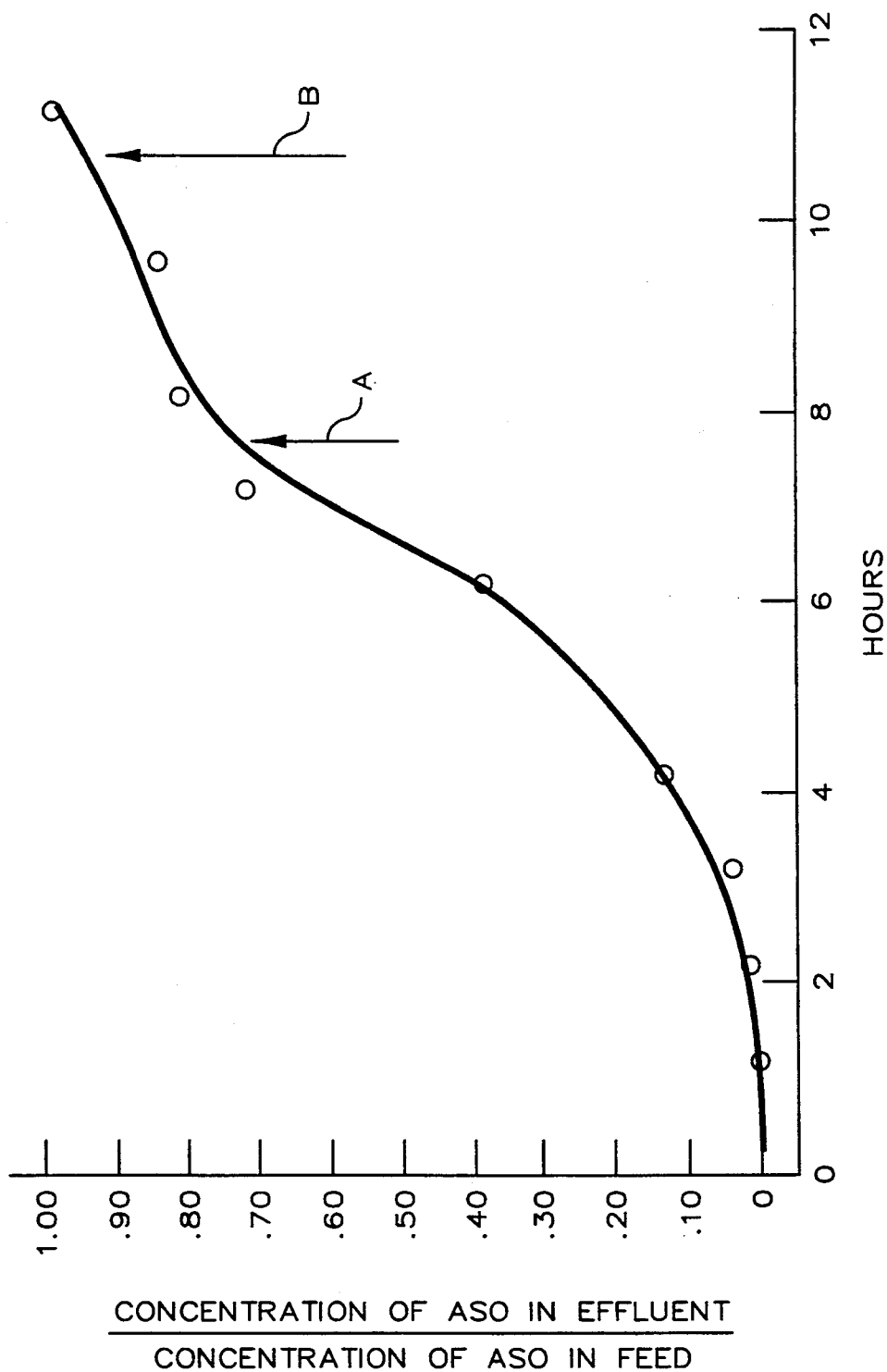
FIG. 2 is an ASO concentration curve for the effluent of a separation which simultaneously removes HF and ASO from sulfolane, and which is used for adsorption bed end point determination.

Any suitable means for determining the derivative of the continuous signal illustrated in FIG. 2 may be used in this invention. However, for digital computation of control algorithms such as determining on-line the derivative of a continuous signal, difference equations are generally preferred since they are easily implemented in digital systems. Noting that noise is accentuated in determining a first difference (corresponding to $d/dt$ in the analog case) and even more so in the second difference (corresponding to $d^2/dt^2$), some smoothing must be accomplished before the derivative is calculated.

A preferred technique for obtaining derivatives is the use of interpolation formulas, wherein taking values of several equally spaced points, an analytical differentiation can be performed giving a much smoother derivative signal. One formula that has been successfully employed for obtaining derivatives is the four point central difference technique wherein one determines four points $E_n$ to $E_{n-3}$ equally spaced at the sampling interval AT for the variable curve E. The derivative is calculated according to the equation:

$$\frac{\Delta E}{\Delta T} = \frac{1}{6\Delta T} (E_n - E_{n-3} + 3E_{n-1} - 3E_{n-2})$$

where:
E=concentration variable,
$n-1$, $n-2$, and $n-3$ denote times previous to time n,
$\Delta T$=sample interval.

In use the first four points (i.e. points 1 through 4) would be used for the first calculation and points 2 through 5 for the second calculation, and so forth.

Figure 3:
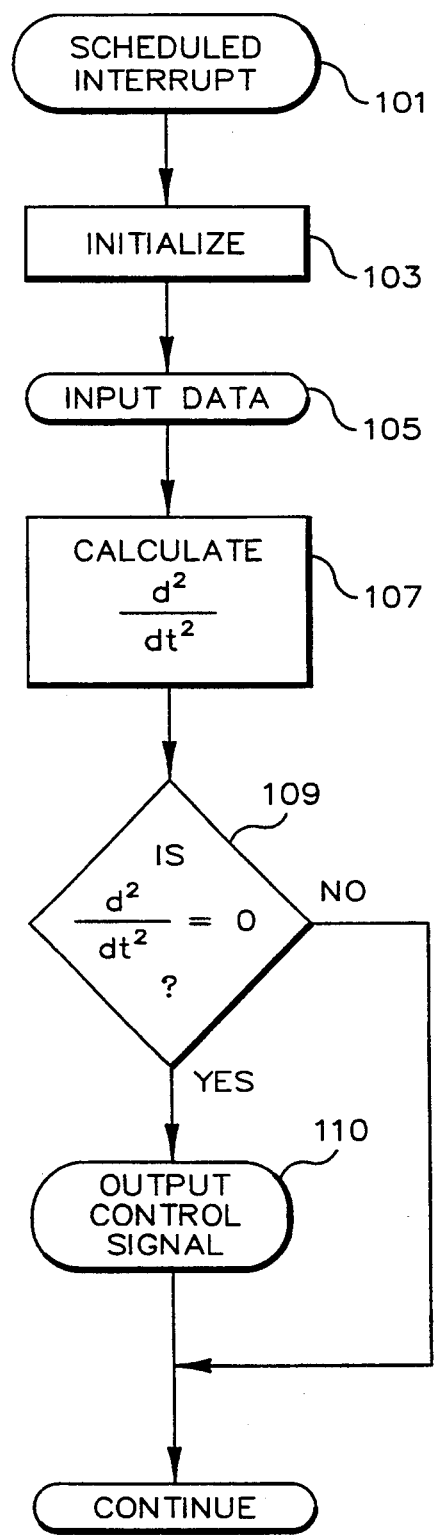
FIG. 3 is a computer flow chart for performing the control function according to this invention.

Referring now to FIG. 3 there is illustrated a computer program flowchart for computer 100 illustrated in FIG. 1. In a preferred embodiment a real time interrupt illustrated in step 101, periodically initializes a program at any desired time interval, for example once every second. On program initialization in step 103, the computer determines which tower is active and then proceeds to read in a series of data points for the active tower based on signal 28 as shown in step 105.

In calculation step 107 the second derivative of the data input in step 105 is determined, preferably by the four point central difference technique previously explained.

The computer next determines in step 109 whether or not the second derivative with respect to time of the input data is equal to zero, and if so a digital type control signal is output on signal line 31 as illustrated in step 110. If not the program continues.

Signal 31, which is a digital type signal, will have a first logic level when inactive and a second logic level when it is activated. Signal 31 is a control signal provided from computer 100 as an input to the valve control 27.

Figure 4:
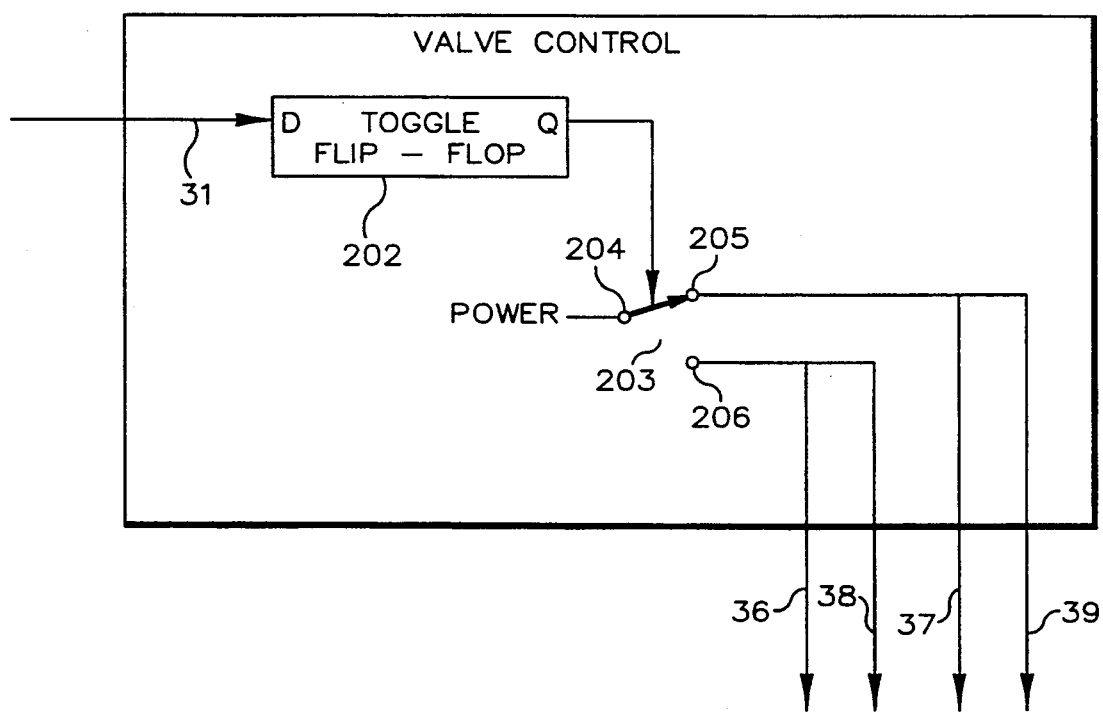
FIG. 4 is a simplified schematic of the valve control illustrated in FIG. 1.

Many different circuits could be utilized for the valve control 27 and one simplified circuit is shown in FIG. 4. Referring to FIG. 4 signal 31 from computer 100 is provided to the input of the toggle flip flop of 202. The Q output from the toggle flip flop 202 is supplied as the switch control input to the switch 203. Terminal 204 of switch 203 is tied to a power line. Terminal 205 supplies signals 37 and 39 which have been previously described. In like manner terminal 206 supplies signals 36 and 38 which have also been previously described.

In operation a change, for example, to a high logic level from a low logic level by signal 31 will cause the toggle flip flop 202 to change states. This change will cause the switch 203 to change positions which will have the desired effect of changing the position of valves 41–44.

In summary switching control of the two parallel arranged adsorption towers based on a UV-analyzer 29 provides switching between the adsorption towers 14 and 16 based on HF loading of the exhausted tower. Such control significantly improves the efficiency of the adsorption separation process.

The invention has been described in terms of a preferred embodiment as illustrated in FIGS. 1–4. Specific components which can be used in the practice of this invention as illustrated in FIG. 1 such as the UV-analyzer 29 and control valves 41–44 are each well known, commercially available control components such as are described at length in Perry's Chemical Handbook, 5th Edition, Chapter 22, McGraw-Hill 1984.

While the invention has been described in terms of the presently preferred embodiment, reasonable variations and modifications are possible by those skilled in the art and such modifications and variations are within the scope of the described invention and the appended claims.

That which is claimed is:

1. A method for controlling switching of the flow of a process stream from a first adsorption tower to a second adsorption tower, wherein said process stream comprises sulfolane having contaminants of acid soluble oil (ASO) and a hydrogen halide, and wherein said first and second adsorption towers contain an adsorbent for collecting said ASO and said hydrogen halide, said method comprising the steps of:

(a) providing said process stream through a first valve to said first adsorption tower and through a second valve to said second adsorption tower, wherein said first valve is open to allow flow of said process stream through said first adsorption tower for the removal of substantially all of said hydrogen halide contaminant and a portion of said ASO contaminant, and said second valve is closed to prevent flow of said process stream through said second adsorption tower while said process stream is flowing through said first adsorption tower;

(b) establishing a control signal representative of the presence of an exhaustive amount of said hydrogen halide retained in said first adsorption tower, wherein the remaining capacity of said adsorbent material in said first adsorption tower to retain said hydrogen halide is below an acceptable limit; and (c) closing said first valve and opening said second valve in response to said control signal.

2. A method in accordance with claim 1 wherein said control signal is a digital type signal generated in a digital computer, and said step of establishing said control signal comprises:

establishing in said computer a concentration curve of ASO remaining in the effluent of said first adsorption tower;

calculating a second derivative curve based on said concentration curve;

determining a maximum point of said second derivative curve; and generating said control signal about the time when said second derivative curve reaches a maximum.

3. A method in accordance with claim 2 wherein said ASO absorbs radiation of wavelengths in a range of about 375 nm to about 650 nm.

4. A method in accordance with claim 2 additionally comprising:

using UV-VIS spectroscopy concentration measurements to establish said concentration curve; and using a four point central difference technique for calculating said second derivative of said concentration curve.

5. A method in accordance with claim 1 wherein said hydrogen halide is selected from the group consisting of hydrogen chloride, hydrogen fluoride and hydrogen bromide and said adsorbent is selected from the group consisting of gamma-alumina and reversible bases.

6. Apparatus for switching the flow of a process stream from a first adsorption tower to a second adsorption tower with the aid of a computer, wherein said first and second adsorption towers each contain a bed of an adsorbent material, said apparatus comprising:

(a) means for providing said process stream through a first valve to said first adsorption tower and through a second valve to said second adsorption tower, wherein said first valve is open to allow flow of said process stream through said first adsorption tower for the removal of substantially all of a first contaminant comprising acid soluble oil (ASO) and a portion of a second contaminant comprising a hydrogen halide and said second valve is closed to prevent flow of said process stream through said second adsorption tower while said process stream is flowing through said first adsorption tower;

(b) means for withdrawing an effluent stream from said first adsorption tower and said second adsorption tower;

(c) means for establishing a concentration vs. time curve for said ASO remaining in said effluent stream;

(d) means for calculating a second derivative curve with respect to time based on said concentration vs. time curve;

(e) means for determining a maximum point of said second derivative curve;

(f) means for establishing a digital type control signal wherein said digital type control signal is triggered at about the time when said second derivative curve reaches said maximum point; and (g) means for switching the open or closed position of said first valve and said second valve responsive to said digital type control signal.

7. Apparatus in accordance with claim 6, wherein said ASO absorbs radiation of wavelengths in a range of about 375 nm to about 650 nm.

8. Apparatus in accordance with claim 7 additionally comprising:

a UV-VIS spectrometer for concentration measurements to establish said concentration curve for ASO remaining in said effluent stream; and means using a four point central difference technique for calculating said second derivative curve.

9. Apparatus in accordance with claim 6 wherein said hydrogen halide is selected from the group consisting of hydrogen chloride, hydrogen fluoride and hydrogen bromide and said adsorbent is selected from the group consisting of gamma-alumina and reversible bases.

10. Apparatus for switching the flow of a process stream from a first adsorption tower containing an adsorbent bed to a second adsorption tower containing an adsorbent bed, and wherein said process stream comprises sulfolane having contaminants of acid soluble oil (ASO) and a hydrogen halide, said apparatus comprising:

analysis means for determining the concentration of ASO in an effluent stream of said first adsorption tower or said second adsorption tower;

digital computer means operatively connected to said analysis means, for generating a control signal, wherein said computer is programmed for:

(a) receiving a plurality of data points from said analysis means to establish a concentration curve;

(b) calculating a second derivative curve based on said concentration curve;

(c) determining the time when said second derivative equals zero;

(d) generating said control signal at about the time when said second derivative equals zero; and (e) switching the flow of said process stream from said first adsorption tower to said second adsorption tower responsive to said control signal.

11. Apparatus in accordance with claim 10 wherein said analysis means comprises UV-VIS spectroscopy.

12. Apparatus in accordance with claim 11 wherein said ASO absorbs radiation of wavelengths in a range of about 375 nm to about 650 nm.

13. Apparatus in accordance with claim 12, wherein said hydrogen halide is selected from the group consisting of hydrogen chloride, hydrogen fluoride, and hydrogen bromide and said adsorbent is selected from the group consisting of gamma-alumina and reversible bases.

* * * * *